(12) United States Patent
Wright et al.

(10) Patent No.: US 9,070,096 B2
(45) Date of Patent: Jun. 30, 2015

(54) APPLIANCE AND PAIR DEVICE FOR PROVIDING A RELIABLE AND REDUNDANT ENTERPRISE MANAGEMENT SOLUTION

(75) Inventors: Phillip Andrew Wright, Boulder, CO (US); Taber West, Santa Fe, NM (US); Jeorg William Erich Houck, Broomfield, CO (US); Jay Avner Caviness, Arvada, CO (US); Peter Clowes, Denver, CO (US); Chaofeng Eric Kao, Golden, CO (US)

(73) Assignee: McKesson Financial Holdings, Hamilton (BM)

(*) Notice: Subject to any disclaimer, the term of this patent is extended or adjusted under 35 U.S.C. 154(b) by 776 days.

(21) Appl. No.: 12/539,213

(22) Filed: Aug. 11, 2009

(65) Prior Publication Data
US 2011/0040575 A1 Feb. 17, 2011

(51) Int. Cl.
G06Q 10/06 (2012.01)
G06Q 50/24 (2012.01)
G06F 9/455 (2006.01)

(52) U.S. Cl.
CPC ...... *G06Q 10/06* (2013.01); *G06F 2009/45575* (2013.01); *G06Q 10/067* (2013.01); *G06Q 50/24* (2013.01)

(58) Field of Classification Search
CPC ............... G06F 9/45533; G06F 9/455; G06F 2009/45575; G06Q 50/22; G06Q 50/24
USPC ....................... 705/2–3; 718/1, 105
See application file for complete search history.

(56) References Cited

U.S. PATENT DOCUMENTS

| | | | | |
|---|---|---|---|---|
| 7,412,623 | B1* | 8/2008 | Lindberg | 714/33 |
| 7,451,443 | B2* | 11/2008 | Lowell et al. | 718/1 |
| 8,135,985 | B2* | 3/2012 | Mishra et al. | 714/13 |
| 2005/0066002 | A1* | 3/2005 | Teres et al. | 709/204 |
| 2006/0090136 | A1* | 4/2006 | Miller et al. | 715/734 |
| 2008/0033902 | A1* | 2/2008 | Glaizel et al. | 707/1 |
| 2008/0059556 | A1* | 3/2008 | Greenspan et al. | 709/201 |
| 2008/0262816 | A1* | 10/2008 | Lontka | 703/13 |
| 2008/0312893 | A1* | 12/2008 | Denton | 703/11 |
| 2009/0228629 | A1* | 9/2009 | Gebhart et al. | 711/6 |
| 2010/0257269 | A1* | 10/2010 | Clark | 709/226 |

OTHER PUBLICATIONS

Bauwens, M. (1994). What is cyberspace? Computers in Libraries, 14(4), 42. Retrieved from http://search.proquest.com/docview/231046074?accountid=14753.*

* cited by examiner

*Primary Examiner* — Mark Holcomb
(74) *Attorney, Agent, or Firm* — Alston & Bird LLP

(57) ABSTRACT

A system for providing a reliable and redundant enterprise management solution includes an appliance disposed at a healthcare facility and a pair device disposed at a remote facility. The appliance includes first processing circuitry, a first virtualization manager and a first synchronizer. The first processing circuitry is configured to enable execution of a plurality of applications. The first virtualization manager is configured to virtualize at least storage components and an execution environment for at least some of the applications. The pair device includes second processing circuitry, a second virtualization manager and a second synchronizer. The second processing circuitry provides redundancy for the first processing circuitry. The second virtualization manager is configured to provide redundancy with respect to the virtualized storage components and execution environment. The second synchronizer is configured to communicate with the first synchronizer to enable shifting of operations with respect to one of the applications being executed between the appliance and the pair device. A corresponding method and apparatus are also provided.

22 Claims, 5 Drawing Sheets

APPLIANCE AND PAIR DEVICE FOR PROVIDING A RELIABLE AND REDUNDANT ENTERPRISE MANAGEMENT SOLUTION

TECHNOLOGICAL FIELD

Embodiments of the present invention relate generally to health care management solutions and, more particularly, relate to an appliance and pair device for providing a reliable and redundant enterprise management solution.

BACKGROUND

Healthcare system improvements are continually being developed and sought after by providers and consumers alike. As health systems face economic pressures to increase their bottom line, there are constant efforts to develop measures and management systems that may increase efficiency in various aspects of health care management.

One such aspect relates to the management of healthcare related enterprise applications. In this regard, hospitals often deploy a number of applications for managing data corresponding to various different healthcare related issues. For example, different applications may be employed for various aspects of claims management, personnel management, equipment management, patient management and numerous other activities. In some cases, different vendors and different security protocols may be associated with one or more of the different applications. Thus, control over the consistency, manageability and security associated with installing, running and supporting hospital and healthcare related enterprise applications may become costly and complex.

Based on the issues discussed above, the total cost of ownership of information technology (IT) equipment and applications may be an important issue for hospitals and healthcare systems. However, the issues may extend beyond cost and complexity in some cases because software in many traditional models is deployed in a distributed fashion where applications from one vendor may operate as part of a large data center at a hospital or healthcare system site. Often, over the counter servers and storage hardware may be pieced together to share network resources with the rest of the hospital or healthcare system's enterprise. Thus, for example, network, hardware and storage resources may be shared between different software vendors and various compatibility and security problems may be created due to variances in the accepted standards among vendors. In some cases, shared ownership over portions of a software stack may further complicate enterprise management with respect to software and IT equipment.

Accordingly, it may be desirable to provide an improved system via which at least some of the issues discussed above may be addressed.

BRIEF SUMMARY

A method, apparatus and system are therefore provided to enable the provision of a reliable and redundant enterprise management solution that may address some of the problems discussed above. Accordingly, for example, an appliance capable of condensing a datacenter into a single container may be provided with a corresponding capability to provide redundancy for the appliance at a remote facility. Thus, maintenance, repair, replication and load balancing may be accomplished from and/or in cooperation with a pair device at a remote facility.

In one exemplary embodiment, a method of providing a reliable and redundant enterprise management solution is provided. The method may include providing an appliance disposed at a healthcare facility and a providing pair device disposed at a remote facility. In this regard, the appliance includes, first processing circuitry configured to enable execution of a plurality of applications, a first virtualization manager configured to virtualize at least storage components and an execution environment for at least some of the applications, and a first synchronizer. The pair device includes second processing circuitry providing redundancy for the first processing circuitry, a second virtualization manager configured to provide redundancy with respect to the virtualized storage components and execution environment, and a second synchronizer. The method may further include providing communication between the first synchronizer and the second synchronizer to enable shifting of operations with respect to one of the applications being executed between the appliance and the pair device.

In another exemplary embodiment, a system for providing a reliable and redundant enterprise management solution is provided. The system includes an appliance disposed at a healthcare facility and a pair device disposed at a remote facility. The appliance includes first processing circuitry, a first virtualization manager and a first synchronizer. The first processing circuitry is configured to enable execution of a plurality of applications. The first virtualization manager is configured to virtualize at least storage components and an execution environment for at least some of the applications. The pair device includes second processing circuitry, a second virtualization manager and a second synchronizer. The second processing circuitry provides redundancy for the first processing circuitry. The second virtualization manager is configured to provide redundancy with respect to the virtualized storage components and execution environment. The second synchronizer is configured to communicate with the first synchronizer to enable shifting of operations with respect to one of the applications being executed between the appliance and the pair device.

In another exemplary embodiment, an apparatus for providing a reliable and redundant enterprise management solution is provided. The apparatus may include processing circuitry, a virtualization manager and a synchronizer. The processing circuitry may be configured to enable execution of a plurality of applications. The virtualization manager may be configured to virtualize at least storage components and an execution environment for at least some of the applications. The synchronizer may be configured to communicate with a corresponding synchronizer of a pair device located at a remote facility remote with respect to the healthcare facility. The synchronizer may also enable shifting of operations with respect to one of the applications being executed between the apparatus and the pair device.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
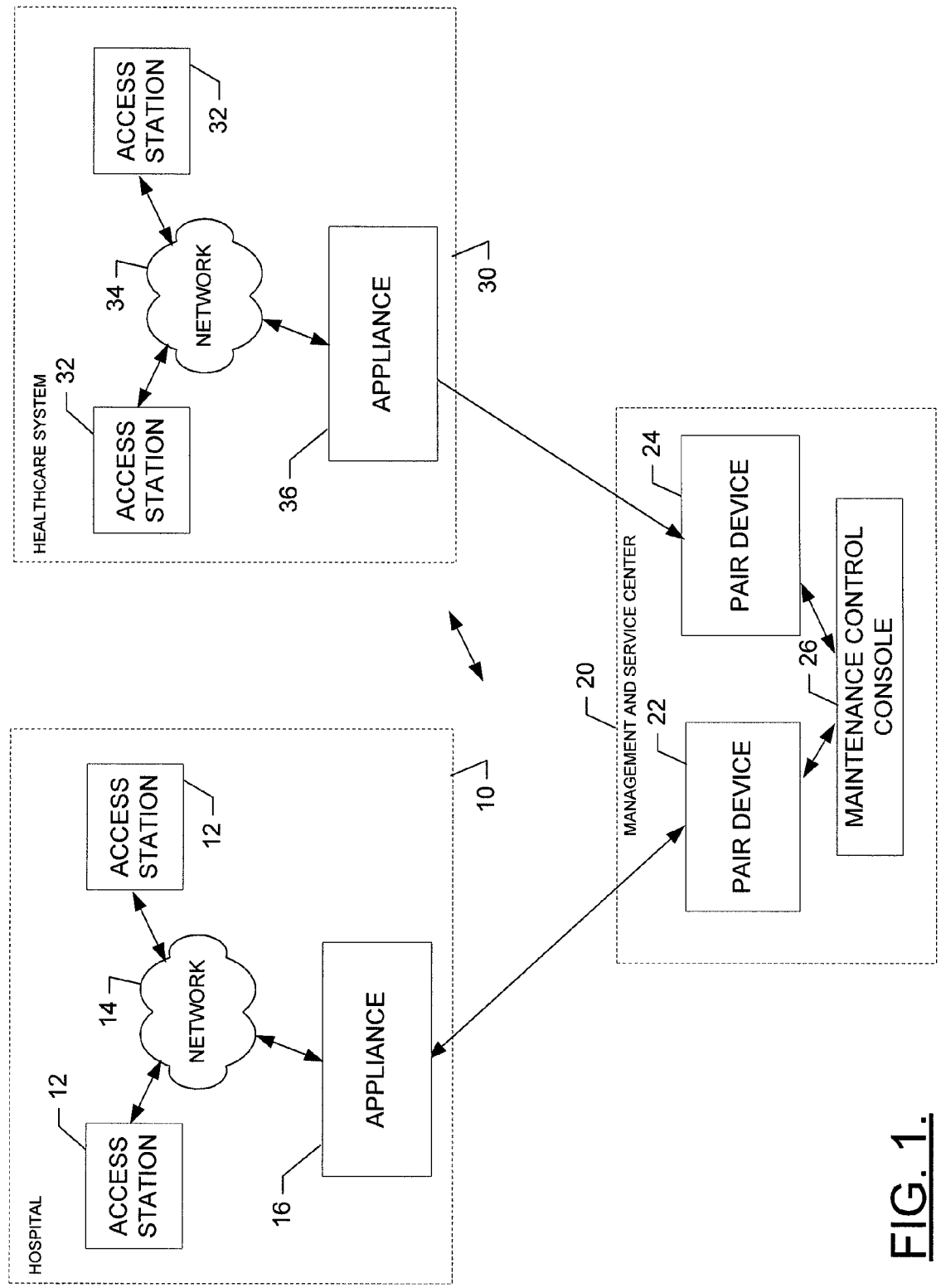
FIG. 1 is a block diagram illustrating a system for providing a reliable and redundant enterprise management solution according to an exemplary embodiment of the present invention.

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As indicated above, embodiments of the present invention are aimed at providing a mechanism by which some of the disadvantages of the traditional distributed IT infrastructure of healthcare systems and hospitals may be addressed. In an exemplary embodiment, a compact and complete computing environment or appliance may be provided in a single, portable housing to be deployed at a remote location (e.g., a hospital or healthcare system location). Meanwhile, all components of the appliance may be redundant in terms of software and hardware environments at a central location. The appliance may include one or more servers, storage devices, network switches, load balancers, security switches and backup devices all within a single housing. The internal software environment may include all of applications used by the hospital or healthcare system to publish and distribute applications to personnel over existing networks and using existing work stations. As such, the appliance may essentially be a turn-key information management solution.

However, beyond merely providing a convenient and portable solution for comprehensive application hosting for the hospital or healthcare system, the redundant nature of the appliance may enable full replication of the software environment of the appliance at its corresponding pair device. The replication may enable one unit to completely fail, but still enable users at the hospital or healthcare system to connect to the other unit (even if the unit is remote) in order to provide full functionality.

The redundant nature of the appliance and its corresponding pair device also enables remote management and servicing of the appliance (or groups of appliances). In some embodiments, the appliance and/or the pair device may employ virtualization technologies for operating systems, storage, networking and applications in order to enable the appliance to be a flexible endpoint for software distribution and reduce the variation of software deployments and installs in the field. Furthermore, by enabling the creation of standards based virtual software packages at the factory, the software packages may be thoroughly tested prior to deployment in a hospital or healthcare system environment. Thus, for example, fully installed and configured environments may be created and deployed to the appliance prior to the appliance being delivered to the hospital or healthcare system environment. Accordingly, risks to the hospital or healthcare system in relation to loss of functionality may be substantially reduced.

An exemplary embodiment of the invention will now be described in reference to FIG. 1, which illustrates an exemplary system in which an embodiment of the present invention may be employed. As shown in FIG. 1, a system according to an exemplary embodiment may include devices at different locations providing redundancy with respect to applications and various hardware and/or software devices. In this regard, for example, one location at which devices may be located may include a hospital 10. At the hospital 10, the system may include various devices such as one or more workstations or access stations 12 via which a network 14 may be accessed. The access stations 12 may be, for example, personal computers (PCs), laptops, terminals, or other workstations that may enable users to login to or otherwise access the network 14 to perform functions, access information or manage tasks using applications supported by or accessible via the network.

The network 14 may include a collection of various different nodes, devices or functions that may be in communication with each other via corresponding wired and/or wireless interfaces. In some cases, the network 14 may be a local area network (LAN) or another type of data network. In an exemplary embodiment, the network 14 may include or otherwise be in communication with an appliance 16 according to an exemplary embodiment of the present invention. The appliance 16, which will be described in greater detail below, may include a plurality of hardware devices and software to enable the appliance 16 to host all or at least a substantial portion of the applications and functionality that is desired for provision to users via the access stations 12.

In an exemplary embodiment, redundancy for the appliance 16 may be provided at a central location that is remotely located with respect to the hospital 10. In this regard, for example, redundancy may be provided in some cases via devices located at a management and service center 20. More particularly, in some examples, redundancy for the appliance 16 may be provided by a pair device 22 located at the management and service center 20. In some embodiments, the pair device 22 may be functionally, and in some cases also actually, equivalent to the appliance 16. In other words, the pair device 22 may include a redundant copy of all the hardware and/or software located at the appliance 16 such that, for example, the pair device 22 may in some cases be considered a clone of the appliance 16 (or vice versa). In some cases, the pair device 22 may further be in communication with a maintenance control console 26.

In some embodiments, as shown in FIG. 1, the appliance 16 and its corresponding pair device 22 may be in communication with each other via either a wired or wireless network connection. Thus, for example, the appliance 16 and the pair device 22 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the appliance 16 and the pair device 22 may be enabled to communicate with the network and each other by any of numerous different access mechanisms including, for example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as universal serial bus (USB), digital subscriber line (DSL), cable modems, Ethernet and/or the like. In some cases, the pair device 22 may also have a direct or indirect connection to the local network 14 of the remote location at which the appliance 16 is located (e.g., the hospital 10). Thus, for example, if the appliance 16 is damaged or goes down for any reason, the functionality provided by the appliance 16 can still be provided by the pair device 22. Accordingly, from the perspective of a user of one of the access stations 12, seamless operation may be provided with full functionality for all applications hosted by the appliance 16 even when the appliance 16 itself is non-operational or not connected to the network 14.

In some cases, the system may include more than one remote location. In such situations, each remote location may include an instance of an appliance that is tailored to the needs and desires of the corresponding enterprise at each respective remote location. Furthermore, in some cases, some enterprises of large size may have multiple appliances. In each such case, the management and service center 20 may include a corresponding pair device for each respective appliance that is employed remotely. Thus, the management and service center 20 may include a plurality of pair devices, each of which is associated with a corresponding appliance at some remote location. As will be seen below, by placing a plurality of pair devices in a single central (or remote) location, remote maintenance and management for a plurality of appliances may be accomplished at a central location and therefore with reduced cost and complexity.

FIG. 1 shows an example of a situation in which more than one appliance and pair device are employed. In this regard, a second remote location (e.g., a healthcare system 30) is shown in FIG. 1 by way of example. However, it should be appreciated that having a second remote location is not required and that, in fact, in some cases more than two locations (including the potential for many more than two locations) may employ embodiments of the present invention serviced by a single management and service center. As such, FIG. 1 merely illustrates one example situation and should not be taken as being limiting.

In FIG. 1, the healthcare system 30 may have one or a plurality of access stations (e.g., access stations 32) in communication with a network 34. The access stations 32 and the network 34 may be substantially similar to those described above in relation to the devices associated with the hospital 10. As with the hospital 10, the healthcare system 30 may also have an instance of an appliance 36 associated therewith. The management and service center 20 may also include a pair device 24 that corresponds to the appliance 36.

The appliance 36 may be similar to the appliance 16, except that the appliance 36 may be tailored to the needs and/or desires of the healthcare system 30. Thus, for example, the appliance 36 may include specific hardware and software to support applications that are employed by the healthcare system 30. Accordingly, while the basic functionality of the appliance 36 may be the same as the basic functionality of the appliance 16, the specific structure and functionality may be different based on the needs and/or desires of each respective entity. In other words, for example, if the hospital 10 is significantly smaller than the healthcare system 30, the appliance 36 may include larger caches of memory and in some cases operate different or more comprehensive enterprise management software than the appliance 16. However, in either case, the corresponding pair device (e.g., pair device 22 for the appliance 16 and pair device 24 for the appliance 36) may be tailored to match its respective appliance.

As indicated above, the pair devices 22 and 24 may each be located at a remote or central facility and each of the pair devices 22 and 24 may mirror an appliance (e.g., the appliance 16 and the appliance 36, respectively). In some cases, each pair device may be a separate entity. However, in some cases, the pair devices may each form a portion of a server bank or other collection of devices rather than being separate units.

Figure 2:
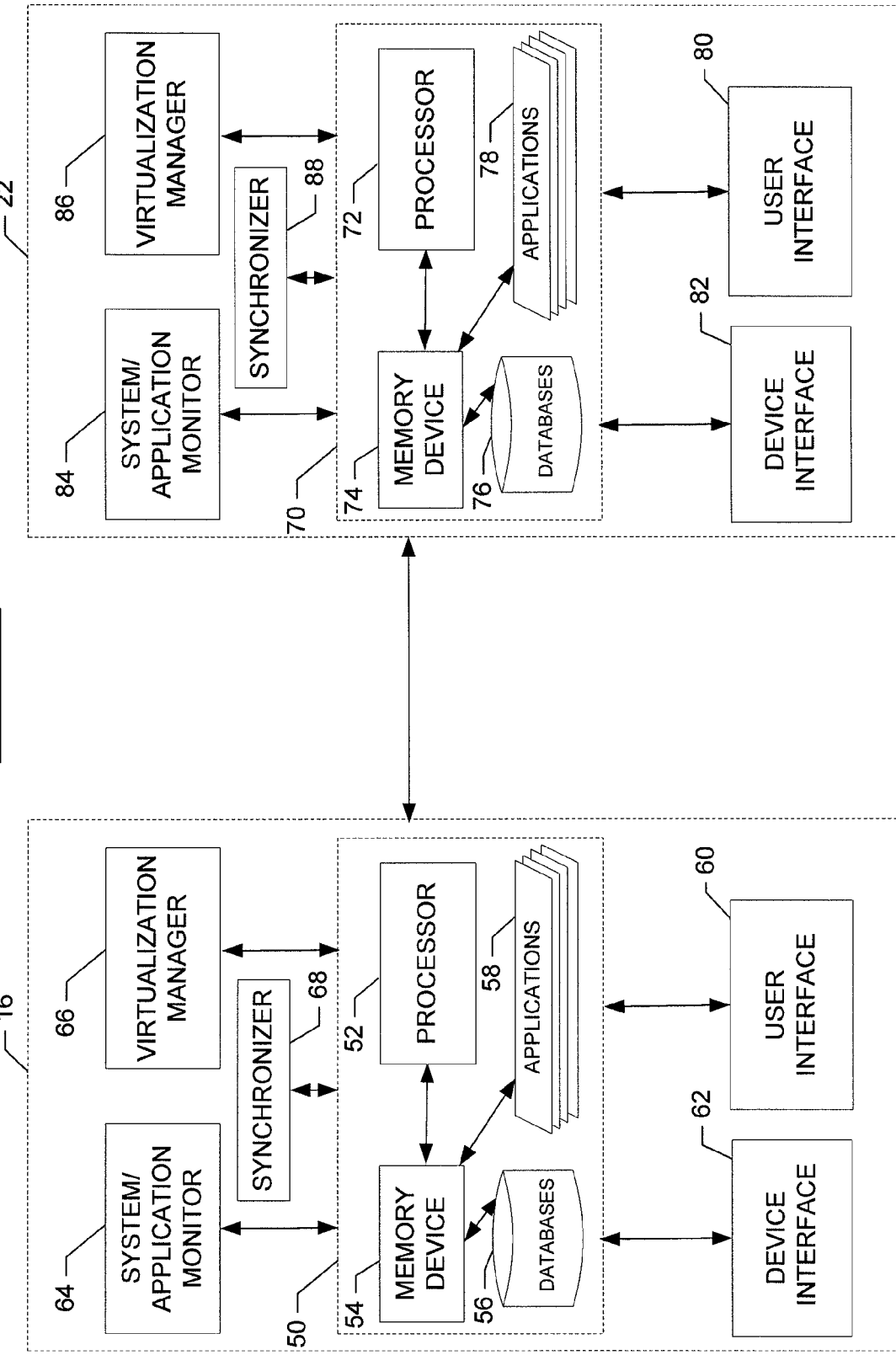
FIG. 2 is a block diagram showing various components that may be included in the system for providing a reliable and redundant enterprise management solution according to an exemplary embodiment of the present invention.

An example embodiment of the appliance 16 will now be described in connection with FIG. 2. In this regard, FIG. 2 is a block diagram showing various components that may be included in the appliance 16 according to an exemplary embodiment. In an exemplary embodiment, the appliance 16 may include processing circuitry 50 that is configured to perform data processing, application execution and other processing and management services according to an exemplary embodiment of the present invention. In one embodiment, the processing circuitry 50 may include a processor 52, a storage device 54 that may be in communication with or otherwise control a user interface 60 and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 may be disposed at another device (e.g., at a computer terminal or client device such as one of the access stations 12) that may be in communication with the processing circuitry 50 via the device interface 62 and/or a network.

The user interface 60 may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an exemplary embodiment, the storage device 54 may include one or more memory devices such as, for example, volatile and/or non-volatile memory that may be either fixed or removable. The storage device 54 may be configured to store information, data, applications, instructions or the like for enabling the appliance 16 to carry out various functions in accordance with exemplary embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., databases 56) that may store a variety of files, contents or data sets. Among the contents of the storage device 54, enterprise applications (e.g., applications 56) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an exemplary embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an exemplary embodiment, the processor 52 (or the processing circuitry 50) may be embodied as, include or otherwise control a system/application monitor 64, a virtualization manager 66 and a synchronizer 68. The system/application monitor 64, the virtualization manager 66 and the synchronizer 68 may each be any means such as a device or circuitry operating in accordance with software or otherwise embodied in hardware or a combination of hardware and software (e.g., processor 50 operating under software control, the processor 50 embodied as an ASIC or FPGA specifically configured to perform the operations described herein, or a combination thereof) thereby configuring the device or circuitry to perform the corresponding functions of the system/application monitor 64, the virtualization manager 66 and the synchronizer 68, respectively, as described below.

As shown in FIG. 2, the pair device 22 may include similar components to those of the appliance 16. Thus, for example, the pair device 22 may include processing circuitry 70 having a processor 72 and a storage device 74. The storage device 74 may include databases 76 and store applications 78 (that mirror the applications 58 on the appliance 16) for execution by the processor 72. The pair device 22 may also include a user interface 80 and a device interface 82 similar to the corresponding components of the appliance 16. The pair device 22 may also include a system/application monitor 84, a virtualization manager 86 and a synchronizer 88, each of which may be similar to their respective counterparts in the appliance 16.

The system/application monitor 64 may be configured to monitor the applications 58 and/or monitor various hardware components for proper operation and/or connectivity. If the system/application monitor 64 detects abnormal or improper functioning of any particular application or device being monitored, the system/application monitor 64 may be configured to provide an alert indicative of the event. Alerts may, in some cases, be provided locally at the appliance 16 or pair device 22 experiencing the improper functioning. However, in some cases, alerts may be provided to the maintenance control console 26.

The maintenance control console 26 may include processing circuitry similar to that described in connection with the appliance 16. However, the maintenance control console 26 may further include user interface devices and/or applications to enable an operator at the management and service center 20 to perform maintenance and/or monitoring operations with respect to either or both of the appliance 16 and the pair device 22. Accordingly, for example, installation of applications, routine maintenance, restoration operations and other activities associated with managing and maintaining the appliance 16 and/or the pair device 22 may be accomplished via the maintenance control console 26. In some cases, the maintenance control console 26 may be in communication with multiple pair devices and appliances. However, in some alternative embodiments, the maintenance control console 26 may actually be a portion of one or more of the pair devices.

The virtualization manager 66 may be configured to provide virtualization of server and storage components. In this regard, for example, in some situations, portions of the appliance 16 may be virtualized on a blade system. Accordingly, the size and complexity of the appliance 16 may be largely reduced. Furthermore, by virtualizing certain components, one or more operating systems may be executed on the same computer hardware (e.g., the processing circuitry 50) concurrently. The virtualization manager 66 may provide for consolidation and rapid provisioning for application deployment and provisioning. Thus, for example, provisioning services may be utilized and effectively provided by the virtualization manager 66. The virtualization manager 66 may also be in communication with the system/application monitor 64 to receive alerts in the event of application or device malfunctions. In such situations, the virtualization manager 66 may be configured to perform dynamic fault recovery procedures to provide the appliance 16 with dynamic fault tolerance against software failures through rapid bootstrapping or rebooting, and hardware fault tolerance through migration of a virtual machine to different hardware. Moreover, in some cases, the different hardware to which a particular virtual machine experiencing a problem may be migrated is the pair device 22. Thus, for example, the virtualization manager 66 may be configured to shift processes or virtual machine operations between the application 16 and the pair device 22 as appropriate to deal with system faults or component failures or unavailability.

The virtualization manager 66 may also be configured to provide an ability to securely separate virtual operating systems and provide application acceleration and/or load balancing. In this regard, for example, in some cases in which particular resources of the appliance 16 are largely consumed, the virtualization manager 66 may enable migration of certain tasks to the pair device 22 to manage and/or balance the workload on the appliance 16. Thus, for example, the virtualization manager 66 may be configured to move a stateful application, such as an application processing patient information, from a local environment (e.g., the appliance 16) to a remote environment (e.g., the pair device 22) while still processing the patient information.

As such, the virtualization manager 66 may provide security, firewalling, application load balancing and routing services for the appliance 16. In some embodiments, the virtualization server 66 may also provide the ability to support old and new software and operating system instances on the same platform. This flexibility may also save on power consumption and space as the appliance 16 is typically housed within a single and potentially mobile (e.g., in a single housing with wheels) environment. Thus, the appliance 16 may act as a "data center in a box" to provide a local private cloud by incorporating security measures. Security measures may be provided, for example, by implementing a user authentication protocol such as Kerberos. Thus, for example, thin client presentation may be provided with secure and lightweight connectivity to local and/or remote applications. In some embodiments, the appliance 16 and the pair device 22 may be CCHIT (Certification Commission for Healthcare Information Technology) certified.

The synchronizer 68 may be configured to synchronize the appliance 16 with the pair device 22 at various intervals. As such, for example, the synchronizer 68 may be configured to communicate with the synchronizer 88 of the pair device 22 in order to ensure that the contents of the storage device 54 and the storage device 74 are substantially synchronized. In some cases, the synchronizer 68 may synchronize the appliance 16 with the pair device 22 at predetermined intervals or times of the day or week. However, in other cases, the synchronizer 68 may be configured to randomly synchronize the appliance 16 with the pair device 22 or perform synchronization operations in response to predefined criteria. Moreover, in some cases, the synchronizer 68 may be configured to enable synchronous replication of the appliance 16 at the pair device 22 to permit continued operation during a fault condition or recovery from a fault condition. Additionally, new installs and/or updates may be replicated from the pair device 22 to the appliance 16 via the synchronizer 68. Thus, for example, a new version of a software application may be installed at the pair device 22 and at the next synchronization interval or in response to the next synchronization triggering event, the synchronizer 68 may install the new version of the software application onto the appliance 16. In this way, as indicated above, remote updates and even remote maintenance, fault recovery and/or repair may be accomplished via the synchronizers 68 and 88 of the appliance 16 and the pair device 22, respectively. In some embodiments, local and remote replication solutions may be administered via a web browser.

Figure 3:
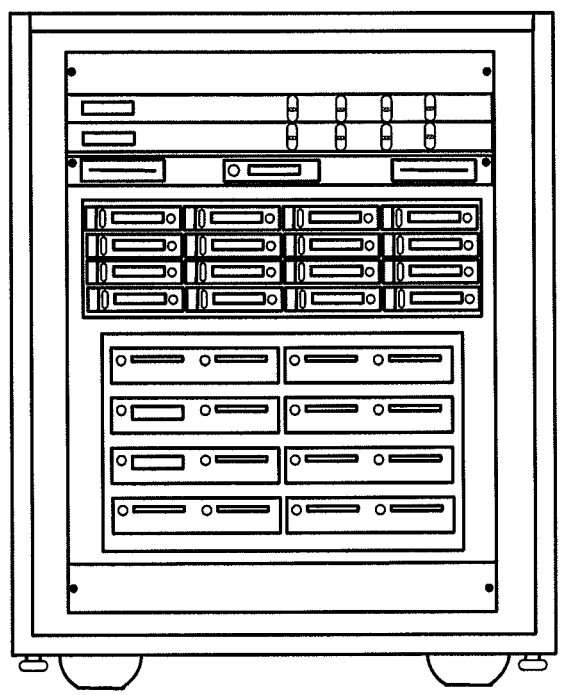
FIG. 3 shows an example of an appliance in a single housing according to an exemplary embodiment of the present invention.
Figure 4:
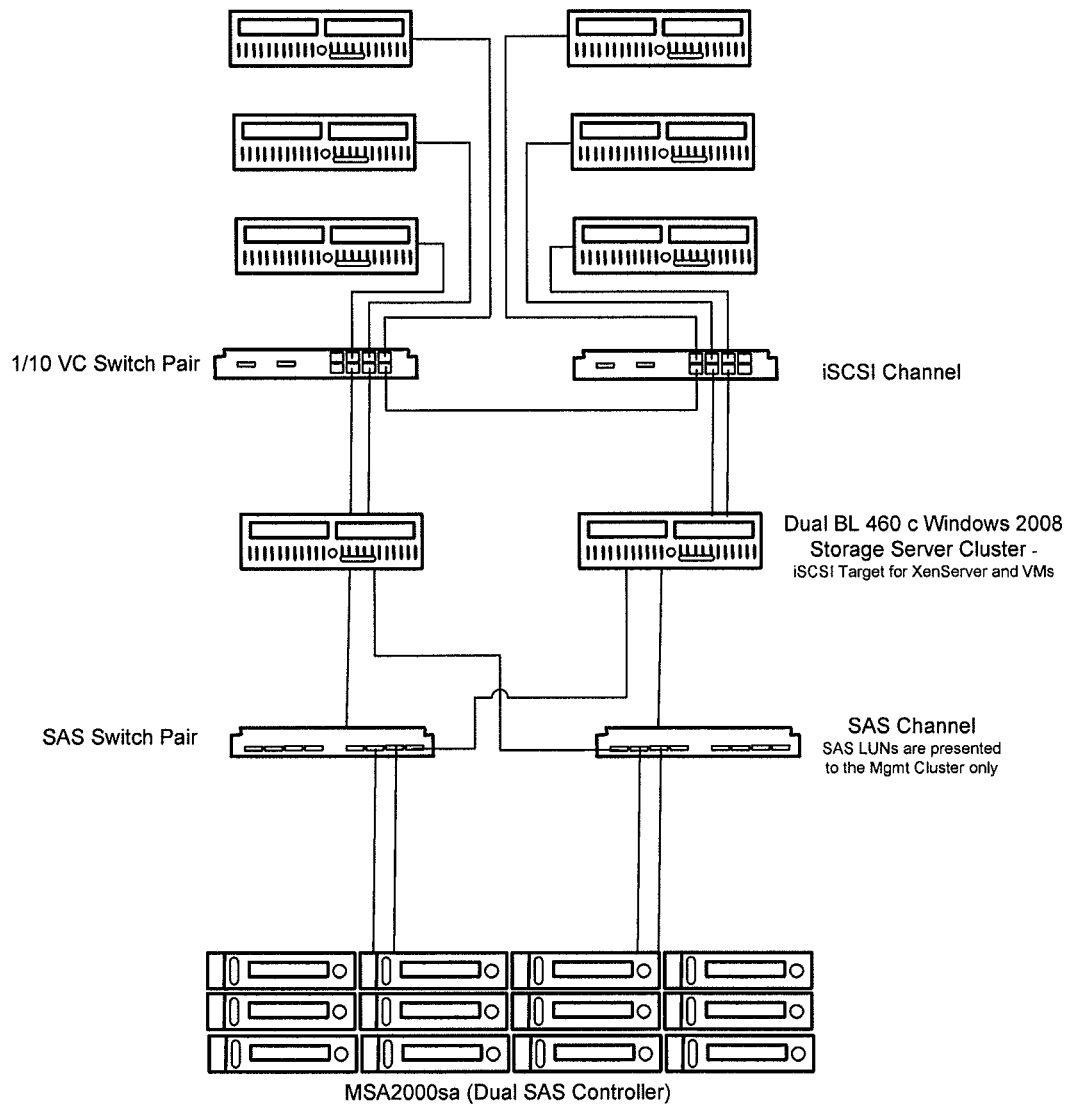
FIG. 4 shows an example topology of a portion of the appliance according to an exemplary embodiment of the present invention.

As indicated above, the appliance 16 may include a various components packaged within a single appliance rack. FIG. 3 illustrates one example of such an appliance rack. The appliance rack may provide an enclosure for a complete data center including digital storage media, tape storage media or any of numerous other storage devices (e.g., an iSCSI (Internet Small Computer Storage Interface) storage array, RAID (Redundant Array of Inexpensive Disks), SAS (Serial Attached SCSI), Random Access Memory (RAM), and/or the like). Corresponding power supplies, switches, cooling fans, high speed interconnections, multiple core processors, and other components may also be included. In one embodiment, a XenServer may be employed within a SAS architecture to enhance access to peripheral devices. An example topology of such an embodiment is shown in FIG. 4.

Some embodiments of the present invention may therefore enable the virtualization and condensing of a datacenter into an appliance within a single container. This may permit greater control over versioning and variance across all layers of the software stack of an enterprise. For example, remote desktop software may be managed collectively with other applications by hospital customers or desktop software may live inside the appliance and exist without variability or end user customization. The same also holds true for networking, storage and user provisioning. Using some embodiments of the present invention, a hospital or healthcare system may experience a decrease in the total cost of ownership by self hosting their own on-site applications. Additionally, a remote mirror may be provided in the form of a pair device that mirrors the appliance. The pair device may enable the provision of upgrades, training, installation and maintenance remotely from a central facility, even though the applications are self-hosted at the appliance, which is located at the healthcare facility (e.g., the hospital or healthcare system location). Routine synchronization between the pair device and the appliance, as well as the virtualization of many components, may also provide for an effective and reliable backup for the information and processes associated with the applications. Healthcare facilities may provide power, in some cases also cooling, and an Ethernet or other network connection for connecting the appliance to the pair device, but all other support tasks may be performed remotely to thereby free the healthcare facility from costs associated with staffing and otherwise hosting the applications.

Figure 5:
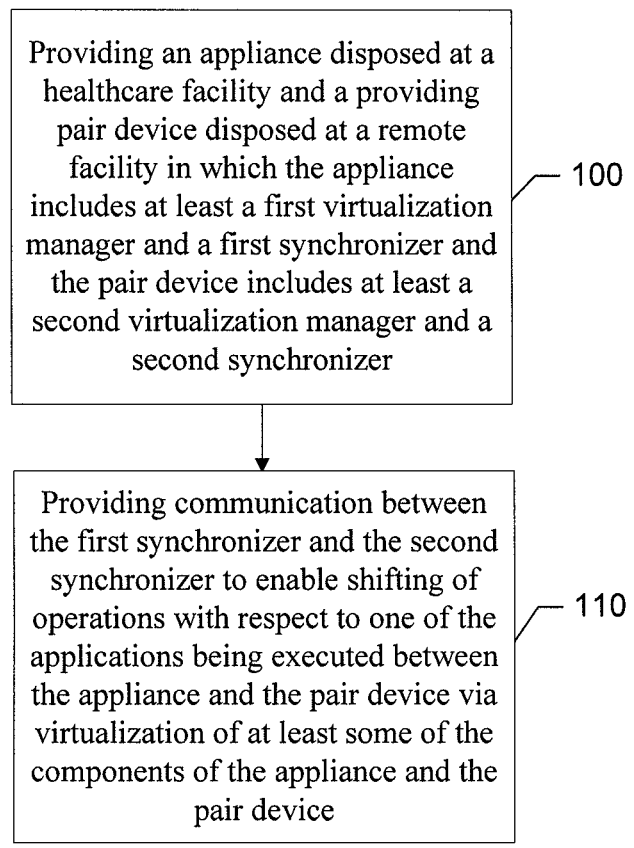
FIG. 5 is a block diagram according to an exemplary method for providing a reliable and redundant enterprise management solution according to an exemplary embodiment of the present invention.

Embodiments of the present invention may therefore be practiced using an apparatuses such as the ones depicted in FIG. 2. However, other embodiments may be practiced in connection with a computer program product for performing embodiments of the present invention. FIG. 5 is a flowchart of a method and program product according to exemplary embodiments of the invention. Each block or step of the flowchart of FIG. 5, and combinations of blocks in the flowchart, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., storage device 52) and executed by processing circuitry (e.g., processor 54).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

In this regard, a method according to one embodiment of the invention, as shown in FIG. 5, may include providing an appliance disposed at a healthcare facility and a providing pair device disposed at a central facility at operation 100. In this regard, the appliance includes, first processing circuitry configured to enable execution of a plurality of applications, a first virtualization manager configured to virtualize at least storage components and an execution environment for at least some of the applications, and a first synchronizer. The pair device includes second processing circuitry providing redundancy for the first processing circuitry, a second virtualization manager configured to provide redundancy with respect to the virtualized storage components and execution environment, and a second synchronizer. The method further includes providing communication between the first synchronizer and the second synchronizer to enable shifting of operations with respect to one of the applications being executed between the appliance and the pair device at operation 110.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus disposed at a healthcare facility, the apparatus comprising:
    processing circuitry configured to enable execution of a plurality of applications;
    a virtualization manager configured to virtualize at least storage components and an execution environment for at least some of the applications;
    a synchronizer configured to communicate with a corresponding synchronizer of a pair device located at a remote facility relative to the healthcare facility, the synchronizer enabling shifting of operations with respect to one of the applications being executed between the apparatus and the pair device, the synchronizer also configured to randomly provide for synchronization with the pair device, wherein the synchronizer is further configured to install an additional application by replication of the additional application from the pair device; and
    an application monitor configured to monitor applications and hardware components for proper connectivity, wherein the application monitor is also configured to monitor at least one of the applications for proper operation and to detect a fault condition,
    wherein the virtualization manager is configured to receive an indication of the fault condition from the application monitor and to perform different fault recovery procedures for a software failure than for a hardware fault with the virtualization manager configured to provide bootstrapping or rebooting in response to the software failure and to provide for migration of a virtual machine to different hardware of the pair device in response to the hardware fault, and
    wherein the virtualization manager is configured to enable testing of the applications in an environment simulating the healthcare facility, prior to delivery of the apparatus to the healthcare facility.

2. The apparatus of claim 1, wherein the pair device includes the same applications and components as the applications and components that are included in the apparatus.

3. The apparatus of claim 1, wherein the virtualization manager is configured to provide replication at the apparatus of application activities at the pair device responsive to synchronization operation performed by the synchronizer.

4. The apparatus of claim 1, wherein the virtualization manager is configured to provide restoration of an application at the apparatus via remote operation at the pair device.

5. The apparatus of claim 1, wherein the virtualization manager is configured to enable the provision of maintenance of a component of the apparatus via remote operation at the pair device.

6. The apparatus of claim 1, wherein the virtualization manager is configured to enable processing of a stateful application to be shifted between the apparatus and the pair device during execution of the stateful application.

7. The apparatus of claim 1, wherein the processing circuitry is configured to provide user authentication services with respect to an executed application.

8. The apparatus of claim 1, wherein the virtualization manager is configured to enable load balancing between the apparatus and the pair device.

9. The apparatus of claim 8, wherein the virtualization manager is configured to enable processing of patient information to be shifted between the apparatus and the pair device during execution of an application associated with the processing of the patient information at one of the apparatus or the pair device.

10. The apparatus of claim 1, wherein the synchronizer is further configured to update an existing application by replication of the existing application from the pair device.

11. The apparatus of claim 1, wherein all components of the apparatus are disposed within a single housing.

12. A system comprising an appliance disposed at a healthcare facility and a pair device disposed at a remote facility, wherein the appliance includes:
    first processing circuitry configured to enable execution of a plurality of applications;
    a first virtualization manager configured to virtualize at least storage components and an execution environment for at least some of the applications; and
    a first synchronizer configured to randomly provide for synchronization with the pair device, wherein the first synchronizer is further configured to install an additional application by replication of the additional application from the pair device, and
wherein the pair device includes:
    second processing circuitry providing redundancy for the first processing circuitry;
    a second virtualization manager configured to provide redundancy with respect to the virtualized storage components and execution environment; and
    a second synchronizer configured to communicate with the first synchronizer to enable shifting of operations with respect to one of the applications being executed between the appliance and the pair device,
    wherein the appliance further includes an application monitor configured to monitor applications and hardware components for proper connectivity, wherein the application monitor is also configured to monitor at least one of the applications for proper operation and to detect a fault condition,
    wherein the first virtualization manager is configured to receive an indication of the fault condition from the application monitor and to perform different fault recovery procedures for a software failure than for a hardware fault with the virtualization manager configured to provide bootstrapping or rebooting in response to the software failure and to provide for migration of a virtual machine to different hardware of the pair device in response to the hardware fault, and wherein the second virtualization manager is configured to enable testing of the applications in an environment simulating the healthcare facility, prior to installation of the applications at the appliance.

13. The system of claim 12, wherein the pair device includes the same applications and components as the applications and components that are included in the appliance.

14. The system of claim 12, wherein the first and second virtualization managers are each configured to provide replication, restoration or maintenance at the appliance with respect to application activities at the pair device responsive to a synchronization operation performed by the first and second synchronizers.

15. The system of claim 12, wherein the first virtualization manager is configured to enable processing of a stateful application to be shifted between the appliance and the pair device during execution of the stateful application.

16. The system of claim 12, wherein the processing circuitry is configured to provide user authentication services with respect to an executed application.

17. The system of claim 12, wherein the first and second virtualization managers are configured to enable load balancing between the appliance and the pair device.

18. The system of claim 12, wherein the first synchronizer is further configured to update an existing application by replication of the existing application from the pair device.

19. The system of claim 12, further comprising a plurality of appliances at different remote healthcare facilities and a plurality of pair devices each of which corresponds to a respective one of the appliances, the pair devices being disposed at the remote facility.

20. A method comprising:
providing an appliance disposed at a healthcare facility and providing a pair device disposed at a remote facility, wherein the appliance includes:
first processing circuitry configured to enable execution of a plurality of applications;
a first virtualization manager configured to virtualize at least storage components and an execution environment for at least some of the applications;
a first synchronizer configured to randomly provide for synchronization with the pair device, wherein the first synchronizer is further configured to install an additional application by replication of the additional application from the pair device; and
an application monitor configured to monitor applications and hardware components for proper connectivity, wherein the application monitor is also configured to monitor at least one of the applications for proper operation, and wherein the pair device includes:
second processing circuitry providing redundancy for the first processing circuitry;
a second virtualization manager configured to provide redundancy with respect to the virtualized storage components and execution environment; and
a second synchronizer,
detecting, with the application monitor, a fault condition with respect to operation of at least one of the applications;
providing communication between the first synchronizer and the second synchronizer to enable shifting of operations with respect to one of the applications being executed between the appliance and the pair device;
receiving, by the first virtualization manager, an indication of the fault condition from the application monitor;
performing, by the first virtualization manager, different fault recovery procedures for a software failure than for a hardware fault with the virtualization manager configured to provide bootstrapping or rebooting in response to the software failure and to provide for migration of a virtual machine to different hardware of the pair device in response to the hardware fault; and
enabling testing by at least one of the first or second virtualization managers, of the applications in an environment simulating the healthcare facility, prior to installation of the applications at the appliance.

21. The method of claim 20, further comprising shifting processing of a stateful application between the appliance and the pair device during execution of the stateful application.

22. The method of claim 20, further comprising updating an existing application by replication by the first synchronizer of the existing application from the pair device.

\* \* \* \* \*